US008713262B2

(12) United States Patent
Overby et al.

(10) Patent No.: US 8,713,262 B2
(45) Date of Patent: Apr. 29, 2014

(54) MANAGING A SPINLOCK INDICATIVE OF EXCLUSIVE ACCESS TO A SYSTEM RESOURCE

(75) Inventors: Mark A. Overby, Bothell, WA (US); Andrew Currid, Alameda, CA (US)

(73) Assignee: Nvidia Corporation, Santa Clara, CA (US)

( * ) Notice: Subject to any disclaimer, the term of this patent is extended or adjusted under 35 U.S.C. 154(b) by 26 days.

(21) Appl. No.: 13/225,249

(22) Filed: Sep. 2, 2011

(65) Prior Publication Data

US 2013/0061005 A1 Mar. 7, 2013

(51) Int. Cl.
*G06F 12/00* (2006.01)

(52) U.S. Cl.
USPC ........... 711/150; 711/151; 711/133; 711/144; 711/E12.001

(58) Field of Classification Search
USPC .................. 711/125, 141, E12.017, E12.001, 711/E12.026, 150, 151, 133, 134
See application file for complete search history.

(56) References Cited

U.S. PATENT DOCUMENTS

| 3,648,252 | A  | * | 3/1972  | Thron et al. ................. 718/103 |
|-----------|----|---|---------|----------------------------------------|
| 6,792,497 | B1 |   | 9/2004  | Gold et al.                            |
| 7,912,930 | B1 | * | 3/2011  | Farooqi et al. ............... 709/223  |
| 8,151,269 | B1 | * | 4/2012  | Brown et al. ................. 718/103  |
| 2004/0064817 | A1 | * | 4/2004 | Shibayama et al. .......... 718/104   |
| 2004/0267996 | A1 |   | 12/2004 | Hammarlund et al.                    |
| 2006/0075060 | A1 |   | 4/2006  | Clark                                |
| 2006/0085793 | A1 | * | 4/2006  | McKenney .................... 718/100 |
| 2007/0248288 | A1 | * | 10/2007 | Nagao et al. .................. 382/303 |
| 2008/0077815 | A1 |   | 3/2008  | Kanakogi                             |
| 2009/0031114 | A1 | * | 1/2009  | Arakawa ........................ 712/215 |
| 2009/0094430 | A1 | * | 4/2009  | Bergheaud et al. ........... 711/163  |
| 2010/0005264 | A1 | * | 1/2010  | Ito et al. ........................ 711/163 |
| 2010/0050184 | A1 | * | 2/2010  | Lin et al. ....................... 718/107 |
| 2010/0250809 | A1 |   | 9/2010  | Ramesh et al.                        |
| 2011/0161540 | A1 |   | 6/2011  | Chang et al.                         |
| 2011/0161599 | A1 | * | 6/2011  | Craske ........................... 711/141 |
| 2011/0179226 | A1 | * | 7/2011  | Takada ........................... 711/125 |

FOREIGN PATENT DOCUMENTS

| EP | 1594059 A2 | 11/2005 |
| GB | 2441903 A  | 3/2008  |

OTHER PUBLICATIONS

United Kingdom Combined Search and Examination Report dated Jan. 23, 2013, UK Patent Application No. GB1215472.0.
English Wikipedia regarding the term spinlock. Jun. 14, 2010.URL: http://web.archive.org/web/20100702054139/http://en.wikipedia.org/wiki/Spinlock (recorded by archive.org on Jul. 2, 2010; called on Jan. 28, 2013).
German Examination Report dated Feb. 4, 2013, German Patent Application No. 102012215439.6.

* cited by examiner

*Primary Examiner* — Mardochee Chery
(74) *Attorney, Agent, or Firm* — Patterson + Sheridan, L.L.P.

(57) ABSTRACT

One embodiment of the present invention sets forth a technique for synchronization between two or more processors. The technique implements a spinlock acquire function and a spinlock release function. A processor executing the spinlock acquire function advantageously operates in a low power state while waiting for an opportunity to acquire spinlock. The spinlock acquire function configures a memory monitor to wake up the processor when spinlock is released by a different processor. The spinlock release function releases spinlock by clearing a lock variable and may clear a wait variable.

16 Claims, 4 Drawing Sheets

MANAGING A SPINLOCK INDICATIVE OF EXCLUSIVE ACCESS TO A SYSTEM RESOURCE

BACKGROUND OF THE INVENTION

1. Field of the Invention

The present invention generally relates to multi-processor computing systems and more specifically to a method for power optimized multi-processor synchronization.

2. Description of the Related Art

Multi-processor systems conventionally include two or more processors implemented on one or more integrated circuit. The two or more processors are typically configured to independently execute programming instructions. Certain applications require that the two or more processors synchronize operations at specific points in execution, for example to share system resources.

One technique for synchronizing operations between the two or more processors involves a programming construct known as a spinlock. The spinlock is a blocking mechanism that enables one processor at a time to own a lock and have exclusive access to system resources corresponding to the lock. The spinlock mechanism beneficially provides significantly lower latency than other types of locking mechanisms. However, the spinlock mechanism can be very inefficient with respect to power consumption.

A spinlock implements an acquire function, a release function, and a lock variable configured to store the lock state. The acquire function monitors the lock variable residing in a shared memory space accessible to the two or more processors. The acquire function checks ownership of the lock variable and may repeatedly recheck ownership until the lock variable is in an unlocked state. If the lock variable state is locked, then the lock is owned by a different processor and the acquire function must wait (spin) in a loop until the different processor releases the lock by setting the lock variable to an unlocked state.

During conventional execution of the acquire function, the operating system raises the processing priority of the processor to such a level that only external hardware interrupts from I/O devices can interrupt the process of waiting for the lock to become available. Timer interrupts are also typically disabled as the operating system disables thread scheduling during these operations. The acquire function requires an associated processor to execute continuously and with high priority. The acquire function can be tremendously inefficient because it causes the processor to execute the same code repeatedly in a loop, causing cache synchronization among the two or more processors. In a multi-socket processor system, the spinlock acquire function will cause an external signal to be asserted on the inter-processor bus to assert a memory locking signal. Each of these operations is power inefficient and cause excessive power consumption. Additionally, the processor executing the acquire function is also required to maintain cache synchronization for each other processor of the two or more processors that is testing this variable in such a manner that the acquire function consumes additional cache line space as well as requiring intra-processor or inter-processor synchronization on related cache lines. The acquire function executing on one processor not only increases power consumption for that processor but also increases power consumption for one or more additional processors, leading to yet greater net power consumption. The significant processing burden associated with the spinlock acquire function can lead to poor overall power efficiency in multi-processor systems.

As the foregoing illustrates, what is needed in the art is a more power efficient technique for implementing multi-processor synchronization.

SUMMARY OF THE INVENTION

One embodiment of the present invention sets forth a technique for managing a spinlock to indicate exclusive access to a system resource, comprising configuring a monitor circuit associated with a first processor to monitor a memory address associated with spinlock state data, testing a lock flag associated with the spinlock state data and determining that the spinlock is in a locked state, waiting in a low power state until the memory address is accessed by a second processor, testing the lock flag associated with the spinlock state data and determining that the spinlock is no longer in the locked state, and indicating that the system resource may be exclusively accessed by the first processor.

Other embodiments of the present invention include, without limitation, a computer-readable storage medium including instructions that, when executed by a processing unit, cause the processing unit to perform the techniques described herein as well as a computing device that includes a processing unit configured to perform the techniques described herein.

One advantage of the disclosed technique is that two or more processor cores may efficiently synchronize operations using a low-latency spinlock construct while efficiently utilizing power and system resources.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
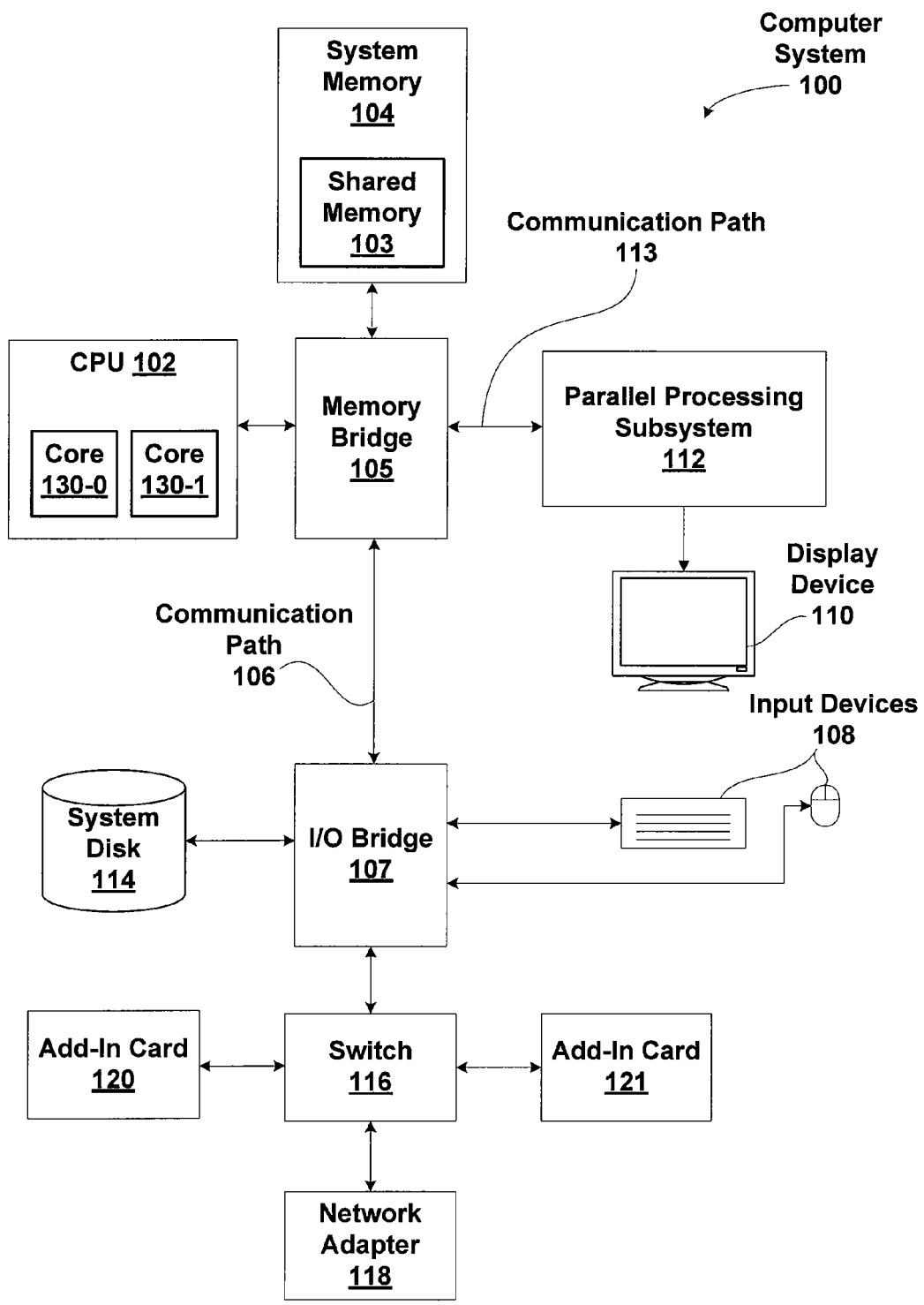
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

In some embodiments, parallel processing subsystem 112 comprises processing elements organized to form rendering pipelines that can be configured to perform various tasks related to generating pixel data from graphics data supplied by CPU 102 and/or system memory 104 via memory bridge 105 and communications path 113 to store and update pixel data to display device 110. In some embodiments, the processing elements are configured to perform general-purpose computations. The processing elements may be identical or different, and each processing element may have its own dedicated parallel processing memory device(s) or no dedicated parallel processing memory device(s). The connection of parallel processing subsystem 112 to the rest of computer system 100 may be varied. In some embodiments, parallel processing subsystem 112 is implemented as an add-in card that can be inserted into an expansion slot of computer system 100. In other embodiments, the parallel processing subsystem 112 can be integrated on a single chip with a bus bridge, such as memory bridge 105 or I/O bridge 107. In still other embodiments, some or all elements of parallel processing subsystem 112 may be integrated on a single chip with CPU 102.

In one embodiment, CPU 102 includes two or more processor cores 130. The processor cores 130 are configured to independently execute instructions, which may be stored in system memory 104, cached within the CPU 102, or stored in any technically feasible location. During the course of normal execution, the processor cores 130 may be required to synchronize operations, for example to share control of common system resources within the computer system 100. A lock, comprising one or more data values within a shared memory location, is used to synchronize operations between or among processor cores 130. A segment of shared memory 103 within system memory 104 may be used to implement a lock. Each processor core 130 may attempt to acquire the lock through a lock acquisition operation on the shared memory 103 and release an acquired lock through a lock release operation on the shared memory 103. A value stored within the lock may be used to indicate which processor core 130 owns the lock. A lock owner may be designated as having exclusive access to a corresponding shared resource. One locking technique known in the art is a spinlock. A processor core 130 may implement a spinlock as a loop that executes at high priority on the processor core 130 until a specified lock is acquired. Two or more processor cores 130 may each attempt to acquire the same lock by independently executing a spinlock, as described in greater detail below.

Figure 2:
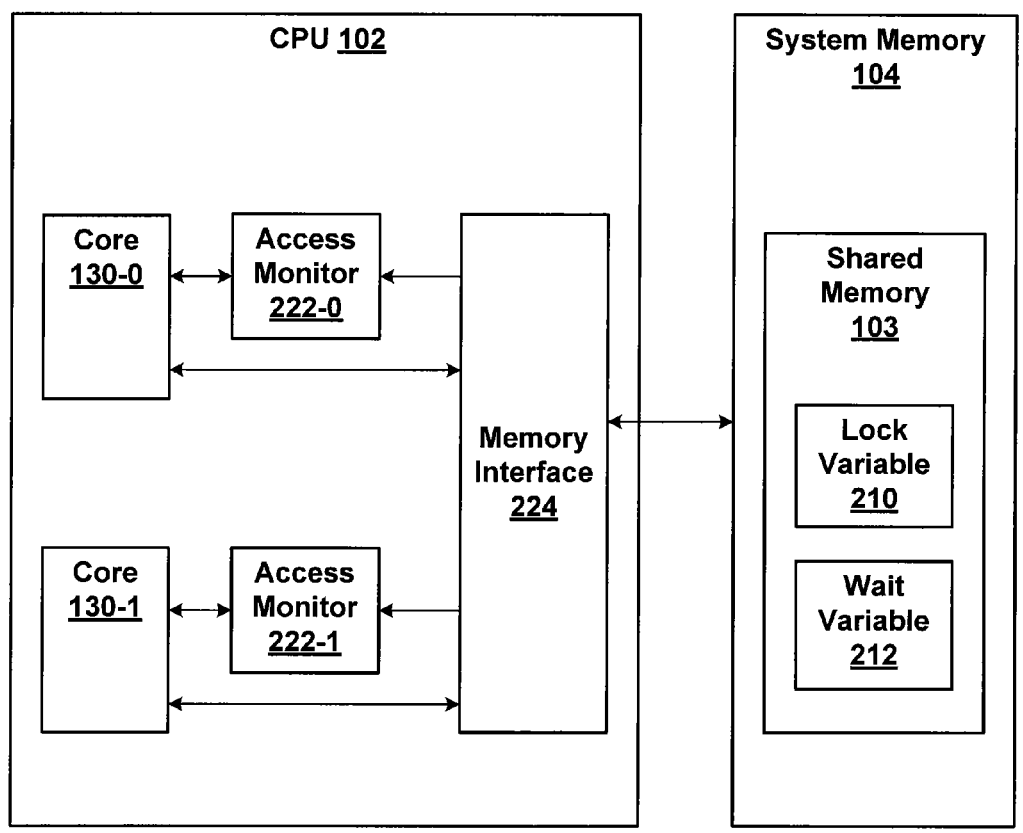
FIG. 2 is a more detailed view of a central processing unit configured to include two processing cores, according to one embodiment of the present invention.

FIG. 2 is a more detailed view of central processing unit 102 of FIG. 1 configured to include two processor cores 130, according to one embodiment of the present invention. Each processor core 130 is coupled to a memory interface 224, which provides access to data residing in system memory 104. The memory interface 224 may be coupled to system memory 104 directly or via memory bridge 105.

Each processor core 130 is configured to execute a "MONITOR" instruction, which includes an address operand. The MONITOR instruction configures an associated access monitor 222 to respond if an access to the specified address operand is performed to system memory 104. After the processor core 130 executes the MONITOR instruction to configure the access monitor, the processor core 130 may execute an "MWAIT" (Memory Wait) instruction, which causes the processor core 130 to halt until an access to the system memory 104 at the specified address is performed. In one embodiment, after a given processor core 130 executes an MWAIT instruction, the processor core 130 enters a low power mode until the specified address is accessed within system memory 104. Persons skilled in the art will recognize the MONITOR and MWAIT instructions as being available within the Intel™ x86 instruction set architecture. In one embodiment access monitors 222 reside within the CPU 102. In an alternative embodiment, one or more access monitors 222 reside within the memory bridge 105. Each access monitor 222 is configured to detect access to the specified address and to wake up an associated processor core 130.

In one embodiment, the shared memory 103 includes a lock variable 210 and a wait variable 212. The lock variable 210 indicates a state of locked or unlocked. A locked state may further indicate which processor core 130 presently owns the lock. The wait variable 212 indicates whether another processor core 130 is presently waiting for the lock. In one embodiment the lock variable 210 comprises an atomic data size for the processor core 130. For example, if the processor core 130 processes 32-bit words, then the lock variable comprises one 32-bit word. Similarly, the wait variable 212 may comprise an atomic data size for the processor core 130. In one embodiment, the lock variable 210 comprises a lock flag, configured to indicate whether a corresponding spinlock state is locked (acquired by a different processor) or free. Additionally, the wait variable 212 comprises a wait flag, configured to indicate whether a processor is waiting to acquire a corresponding spinlock. A locked spinlock state may indicate exclusive access to a corresponding system resource, while an unlocked spinlock state may indicate that the system resource is available to be acquired for exclusive access.

One or more of the access monitors 222 may be configured to monitor a specified address that references the shared memory 103. In one embodiment, the wait variable 212 within the shared memory 103 is monitored to wake up processor cores 130 that are waiting to acquire a spinlock after a processor core 130 releases the spinlock by clearing the lock variable 210. By monitoring the wait variable 212 instead of the lock variable 210, processor cores 130 only wake up when there is a change in spinlock status, rather than every time a processor reads the lock variable 210. In an alternative embodiment, one or more of the access monitors 222 are configured to monitor the lock variable 210, and the wait variable 212 is not needed. In this embodiment, the processor cores 130 wake up more frequently than necessary because reads to the lock variable 210 do not change the spinlock state, but trigger the processor cores 130 to wake up nonetheless as they collectively attempt to acquire spinlock via the lock variable 210. In different alternative embodiment, the access monitors 222 are configured to distinguish between a read access and a write access to the specified address. In such an embodiment, the lock variable 210 is monitored for writes and not reads, and the wait variable 212 is unnecessary. In this, the processor cores 130 wake up only when there is a write access to the lock variable 210, indicating a change in spinlock state.

Persons skilled in the art will understand that the architecture described in FIGS. 1, and 2 in no way limits the scope of the present invention and that the techniques taught herein may be implemented on any properly configured processing unit, including, without limitation, one or more CPUs, one or more cores within a CPU, one or more processing elements within parallel processing subsystem 112, or the like, without departing the scope of the present invention. Furthermore, the spinlock mechanism described herein may be configured to operate among processing cores associated with one or more CPUs, and among processing elements associated with one or more parallel processing subsystems.

Spinlock Synchronization

Figure 3:
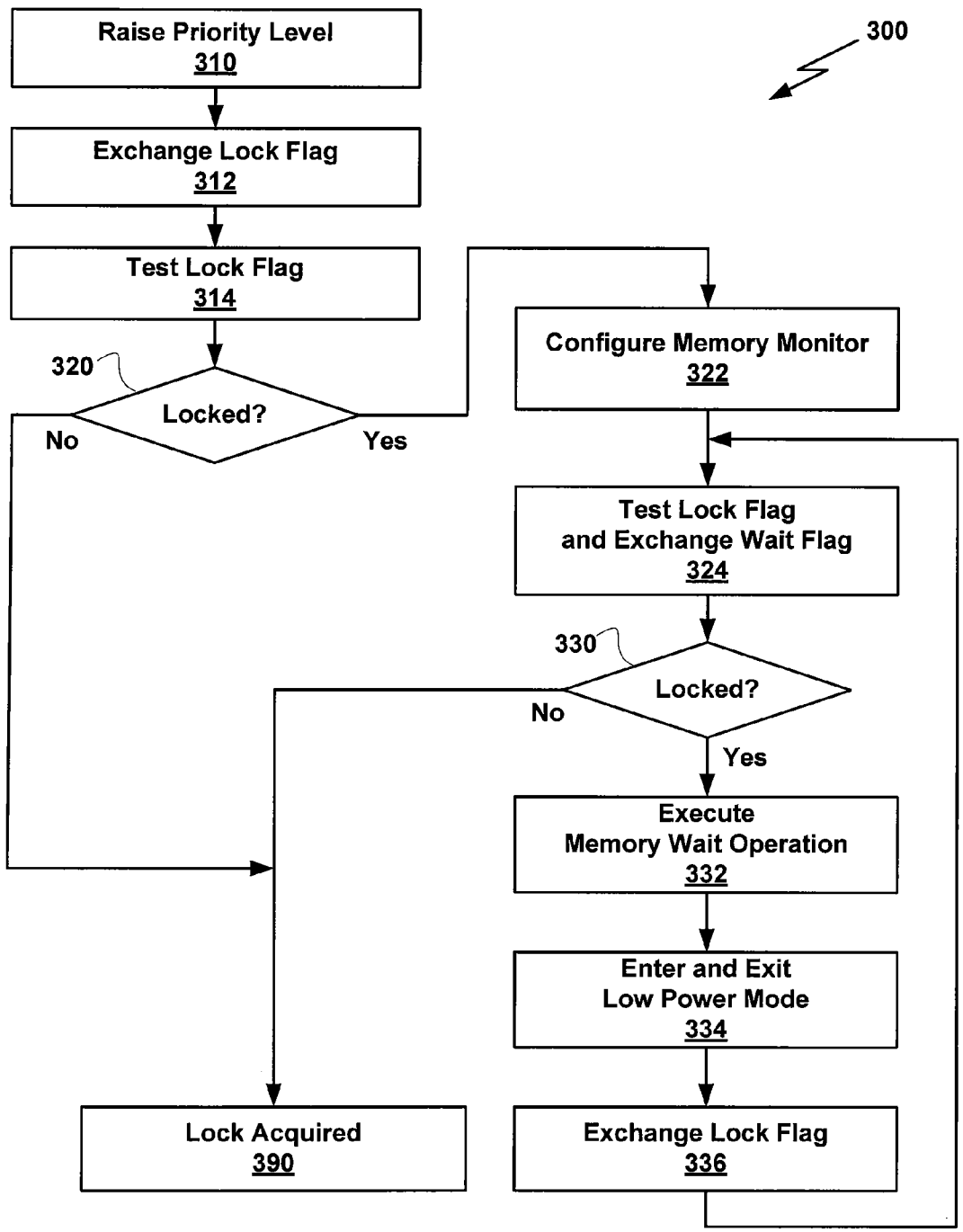
FIG. 3 is a flow diagram of method steps for performing a spinlock acquire function, according to one embodiment of the present invention.

FIG. 3 is a flow diagram of method steps for performing a spinlock acquire function, according to one embodiment of the present invention. Although the method steps are described in conjunction with the systems of FIGS. 1-2, persons skilled in the art will understand that any system configured to perform the method steps, in any order, is within the scope of the present invention. This method may be performed by processor core 130, or any technically feasible processor core or processing element.

The method begins in step 310, where processor core executing a spinlock acquire function raises a priority level for the processor core. In one embodiment, the priority level is raised to the highest available priority level for the processor core. In step 312, the processor core executes an exchange lock flag operation. The exchange lock flag operation may be implemented using any technically feasible technique, such as an atomic compare and exchange operation. For example, the exchange lock flag operation may be implemented to atomically compare and exchange the value of lock variable 210, configured to store a lock flag. In such an implementation, the contents of lock variable 210 are compared with a predefined value for an "unlocked" state (e.g., a value of zero), and if the contents of lock variable 210 are equal to the "unlocked" state, then a new value is exchanged into the lock variable 210. In one embodiment, the new, "locked" value stored in lock variable 210 indicates which processor now owns the lock corresponding to lock variable 210.

In step 314, the lock variable 210 is tested to see if the exchange lock flag operation succeeded. If, in step 320, the lock variable 210 is locked by a different processor core, then the method proceeds to step 322. In step 322, the processor core configures a memory monitor circuit, such as access monitor 222, to monitor an address associated with spinlock state. For example, access monitor 222 may be configured to monitor an address associated with the wait variable 212. Alternatively, the monitor may be configured to monitor the lock variable 210. In step 324, the processor core tests the lock flag. In one embodiment, the processor core also executes an exchange wait flag operation to determine whether a different processor is waiting to acquire the lock.

If, in step 330, the lock variable 210 is locked by a different processor core, then the method proceeds to step 332, where the processor core executes a memory wait (MWAIT) instruction. In step 334, the processor core enters a low power state resulting from the execution of the memory wait instruction. In one embodiment, the low power state includes turning off at least one clock signal for the processor core. The processor core exits the low power state in response to a corresponding access monitor detecting access to the configured address. In step 336, the processor core executes an exchange lock flag operation to attempt to acquire the lock. The method then proceeds back to step 324.

Returning to step 330, if the lock variable 210 is not locked by a different processor core, then the spinlock acquire function has succeeded and the method proceeds to step 390, with the lock acquired. Successful acquisition of the lock is conveyed to a related function, indicating that a corresponding system resource may be accessed exclusively by the processor core. The method terminates in step 390.

Returning to step 320, if the lock variable 210 is not locked by a different processor core, then the method proceeds to step 390.

Figure 4:
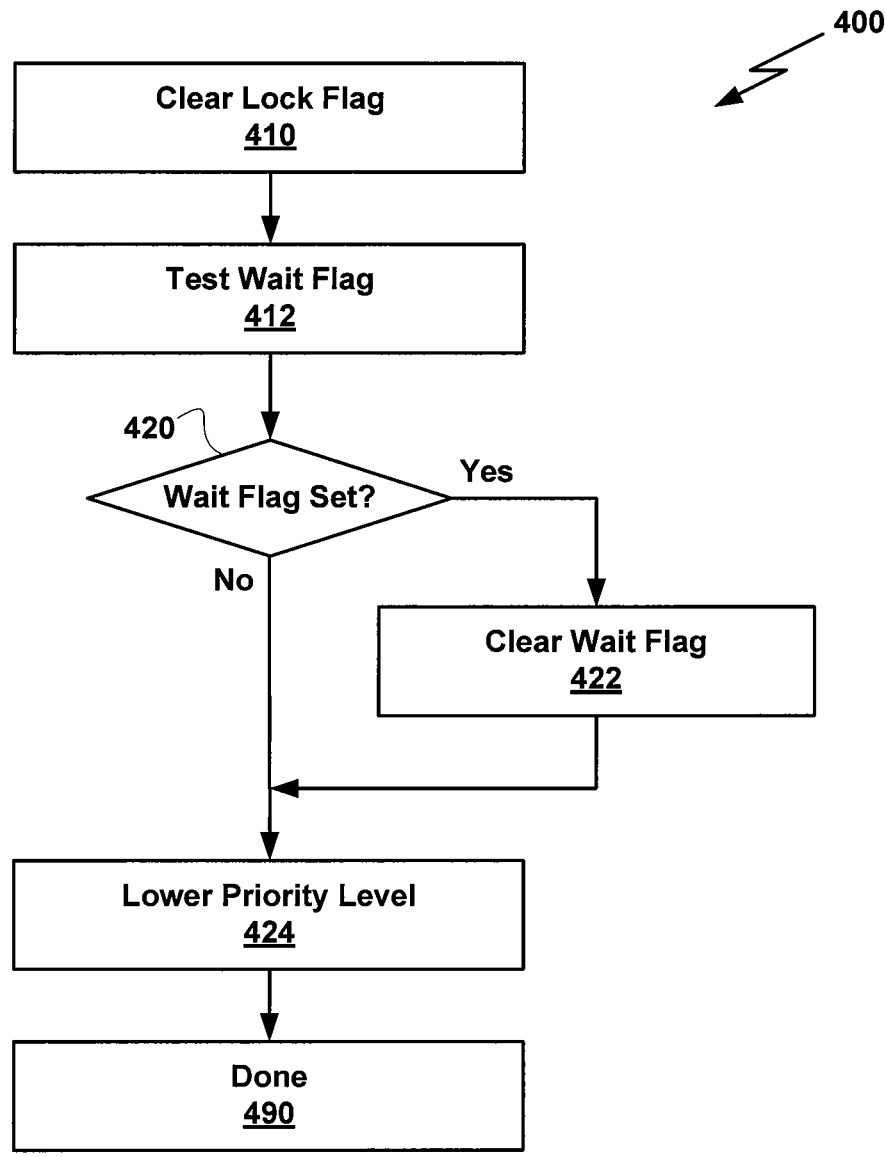
FIG. 4 is a flow diagram of method steps for performing a spinlock release function, according to one embodiment of the present invention.

FIG. 4 is a flow diagram of method steps for performing a spinlock release function, according to one embodiment of the present invention. Although the method steps are described in conjunction with the systems of FIGS. 1-2, persons skilled in the art will understand that any system configured to perform the method steps, in any order, is within the scope of the present invention. This method may be performed by processor core 130, or any technically feasible processor core or processing element.

The method begins in step 410, where the processor core clears the lock flag, for example, by writing a zero to lock variable 210. At this point, the lock is released and is available for acquisition by a different processor core. In step 412, the processor core tests a wait flag, such as wait variable 212 to determine whether a different processor is waiting to acquire the lock. If, in step 420, the wait flag is set then the method proceeds to step 422. The wait flag being set indicates that a different processor is presently waiting to acquire the lock. In one embodiment, the processor core clears the wait flag in step 422. In step 424, the processor core lowers the execution priority level for the processor core. The method terminates in step 490.

Returning to step 420, if the wait flag is not set, then the method proceeds to step 424.

In one embodiment, a single lock flag and a single wait flag indicated spinlock state. In one implementation, the lock flag may indicate one of two states, including an unlocked state and a locked state. In an alternative implementation, the lock flag may indicate an unlocked state and one of a plurality of locked states, each corresponding to a specific processor core owning the lock.

In an alternative embodiment, a wait queue implements an ordered list of processor cores waiting to acquire spinlock. In such an embodiment, step 324 of FIG. 3 comprises adding a processor identification (PID) number to the wait queue and step 422 comprises removing the PID from the wait queue. Any technically feasible technique may be used to implement and represent the wait queue.

In sum, a technique for synchronizing operations between two or more processors is disclosed. The synchronization operations include a spinlock acquire function and a spinlock release function. The spinlock acquire function employs a pair of instructions commonly available within the industry standard x86 instruction set. The spinlock acquire function executes a MONITOR and an MWAIT instruction to enter a low power processor state while waiting to acquire spinlock. A hardware monitor circuit monitors the spinlock state and awakens the processor when the state changes, indicating that an attempt should be made to acquire spinlock. A lock variable and a wait variable may be used to indicate lock state and whether one or more processor cores are waiting to acquire a spinlock that is presently owned by a given processor core. The spinlock release function clears the lock variable and clears the wait variable if the wait variable is set.

One advantage of the disclosed technique is that processor cores may efficiently synchronize operations using a low-latency spinlock construct while efficiently utilizing power and system resources.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

The invention claimed is:

1. A method for managing a spinlock to indicate exclusive access to a system resource, the method comprising:
    upon determining that a first processor is attempting to acquire the spinlock, raising an execution priority level associated with the first processor from an initial priority level to a high priority level;
    configuring a monitor circuit associated with the first processor to monitor a memory address associated with spinlock state data;
    testing a lock flag associated with the spinlock state data and determining that the spinlock is in a locked state;
    waiting in a low power state until the memory address is accessed by a second processor by executing a memory wait operation that causes the first processor to enter the low power state and subsequently exit the low power state when the memory address is accessed by the second processor;
    testing the lock flag associated with the spinlock state data and determining that the spinlock is no longer in the locked state;
    indicating that the system resource is capable of being exclusively accessed by the first processor;
    clearing the lock flag to indicate that the spinlock has been released from the first processor; and
    upon determining that the spinlock has been released from the first processor, setting the priority level of the first processor back to the initial priority level.

2. The method of claim 1, wherein the spinlock state data resides in a shared memory accessible by both the first processor and the second processor, and wherein the memory address defines a location in the shared memory for at least a portion of the spinlock state data.

3. The method of claim 1, wherein the first processor exits the low power state only if the second processor performs a write access operation to the memory address.

4. The method of claim 1, wherein the spinlock state data comprises an ordered queue configured to indicate whether any processors are waiting to acquire the spinlock.

5. The method of claim 1, wherein the spinlock state data comprises the lock flag and a wait flag, the lock flag indicating whether the spinlock is in the locked state, and the wait flag indicating whether the second processor is waiting to acquire the spinlock.

6. The method of claim 5, wherein the memory address defines a location within a shared memory of the wait flag.

7. The method of claim 6, further comprising:
    executing an atomic compare and exchange operation on the spinlock state data to attempt to acquire ownership of the spinlock;
    testing the wait flag and determining that the second processor is waiting to acquire the spinlock; and
    clearing the wait flag to indicate that no processor is currently waiting to acquire the spinlock.

8. A non-transitory computer-readable storage medium including instructions that, when executed by a processing unit, cause the processing unit to manage a spinlock configured to indicate exclusive access to a system resource by performing the steps:
    upon determining that a first processor is attempting to acquire the spinlock, raising an execution priority level associated with the first processor from an initial priority level to a high priority level;
    configuring a monitor circuit associated with the first processor to monitor a memory address associated with spinlock state data;
    testing a lock flag associated with the spinlock state data and determining that the spinlock is in a locked state;
    waiting in a low power state until the memory address is accessed by a second processor by executing a memory wait operation that causes the first processor to enter the low power state and subsequently exit the low power state when the memory address is accessed by the second processor;
testing the lock flag associated with the spinlock state data and determining that the spinlock is no longer in the locked state;
indicating that the system resource is capable of being exclusively accessed by the first processor;
clearing the lock flag to indicate that the spinlock has been released from the first processor; and
upon determining that the spinlock has been released from the first processor, setting the priority level of the first processor back to the initial priority level.

9. The non-transitory computer-readable storage medium of claim 8, wherein the spinlock state data resides in a shared memory accessible by both the first processor and the second processor, and wherein the memory address defines a location in the shared memory for at least a portion of the spinlock state data.

10. The non-transitory computer-readable storage medium of claim 8, wherein the first processor exits the low power state only if the second processor performs a write access operation to the memory address.

11. The non-transitory computer-readable storage medium of claim 8, wherein the spinlock state data comprises an ordered queue configured to indicate whether any processors are waiting to acquire the spinlock.

12. The non-transitory computer-readable storage medium of claim 8, wherein the spinlock state data comprises the lock flag and a wait flag, the lock flag indicating whether the spinlock is in the locked state, and the wait flag indicating whether the second processor is waiting to acquire the spinlock.

13. The non-transitory computer-readable storage medium of claim 12, wherein the memory address defines a location within a shared memory of the wait flag.

14. The non-transitory computer-readable storage medium of claim 13, further comprising:
executing an atomic compare and exchange operation on the spinlock state data to attempt to acquire ownership of the spinlock;
testing the wait flag and determining that the second processor is waiting to acquire the spinlock; and
clearing the wait flag to indicate that no processor is currently waiting to acquire the spinlock.

15. A computing device, comprising:
a memory system;
a first monitor circuit coupled to the memory system; and
a first processor coupled to the memory system and the first monitor circuit, and configured to:
upon determining that a spinlock is to be acquired, raise an execution priority level associated with the first processor from an initial priority level to a high priority level;
configure a monitor circuit associated with the first processor to monitor a memory address associated with spinlock state data;
test a lock flag associated with the spinlock state data and determining that the spinlock is in a locked state;
wait in a low power state until the memory address is accessed by a second processor by executing a memory wait operation that causes the first processor to enter the low power state and subsequently exit the low power state when the memory address is accessed by the second processor;
test the lock flag associated with the spinlock state data and determine that the spinlock is no longer in the locked state;
indicate that the system resource is capable of being exclusively accessed by the first processor;
clear the lock flag to indicate that the spinlock has been released from the first processor; and
upon determining that the spinlock has been released from the first processor, set the priority level of the first processor back to the initial priority level.

16. The computing device of claim 15, wherein the spinlock state data comprises the lock flag and a wait flag, the lock flag indicating whether the spinlock is in the locked state, and the wait flag indicating whether the second processor is waiting to acquire the spinlock, and wherein the first processor is further configured to:
execute an atomic compare and exchange operation on the spinlock state data to attempt to acquire ownership of the spinlock;
test the wait flag and determine that the second processor is waiting to acquire the spinlock; and
clear the wait flag to indicate that no processor is currently waiting to acquire the spinlock.

* * * * *